United States Patent
Jackson et al.

(10) Patent No.: US 8,407,242 B2
(45) Date of Patent: Mar. 26, 2013

(54) TEMPORAL BINDING FOR SEMANTIC QUERIES

(75) Inventors: Thomas E Jackson, Redmond, WA (US); Stuart Bowers, Redmond, WA (US); Chris Karkanias, Sammamish, WA (US); Allen Brown, Sammamish, WA (US); David Campbell, Sammamish, WA (US); Brian Aust, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 12/970,831

(22) Filed: Dec. 16, 2010

(65) Prior Publication Data
US 2012/0158771 A1    Jun. 21, 2012

(51) Int. Cl.
*G06F 17/30*    (2006.01)

(52) U.S. Cl. ........ 707/769; 707/765; 707/739; 707/713; 707/763; 707/722; 709/200; 709/203; 709/206; 709/204; 709/225

(58) Field of Classification Search .......... 707/658–659, 707/669, 765, 739, 713, 763, 722; 709/200, 709/203–205, 206
See application file for complete search history.

(56) References Cited

U.S. PATENT DOCUMENTS

| | | | |
|---|---|---|---|
| 6,339,774 B1* | 1/2002 | Nakayama et al. ............... 1/1 |
| 7,693,823 B2 | 4/2010 | Liu | |
| 7,702,725 B2* | 4/2010 | Erickson et al. ............. 709/203 |
| 8,150,835 B2* | 4/2012 | Boldyrev et al. ............. 707/713 |
| 8,156,107 B2* | 4/2012 | Bawa et al. ................... 707/713 |
| 8,156,134 B2* | 4/2012 | Sun et al. ...................... 707/763 |
| 8,190,555 B2* | 5/2012 | Venugopal et al. ........... 707/602 |
| 8,280,924 B2* | 10/2012 | Olenick et al. ................ 707/807 |
| 2004/0107210 A1* | 6/2004 | Yang et al. .................. 707/104.1 |
| 2004/0243531 A1 | 12/2004 | Dean | |
| 2005/0120062 A1 | 6/2005 | Sinha | |
| 2006/0041661 A1* | 2/2006 | Erikson et al. ................ 709/225 |
| 2007/0011233 A1* | 1/2007 | Manion et al. ................ 709/204 |
| 2007/0271242 A1 | 11/2007 | Lindblad | |
| 2008/0189239 A1* | 8/2008 | Bawa et al. ...................... 707/2 |
| 2008/0208820 A1 | 8/2008 | Usey | |
| 2008/0228482 A1* | 9/2008 | Abe ............................. 704/249 |
| 2009/0132503 A1* | 5/2009 | Sun et al. ......................... 707/4 |
| 2010/0017379 A1 | 1/2010 | Naibo | |
| 2010/0036788 A1* | 2/2010 | Wu et al. ......................... 706/47 |
| 2010/0070448 A1* | 3/2010 | Omoigui ........................ 706/47 |
| 2010/0083240 A1* | 4/2010 | Siman ............................ 717/144 |

(Continued)

OTHER PUBLICATIONS

"Time Challenges—Challenging Times for Future Information Search" Authors: Published Date: Jun. 2009.

(Continued)

*Primary Examiner* — Frantz Coby (57) ABSTRACT

Described are techniques to facilitate temporal features in a semantic data store. Information about lifetimes of facts in a semantic store is maintained. Even when a fact is logically deleted, a physical record is kept available. The record of a logically deleted or invalid fact has associated lifetime information. For example, valid-from and valid-to time values. The record of a fact not yet deleted may have a valid-from time value indicating when it was created, became valid, etc. Queries against the semantic store may specify a timeslice (a point in time or a time range). The lifetime information can be used to satisfy such time-specific queries. Because records are maintained after they are logically deleted, it is also possible to accurately query a past state of the semantic store. Even if such a query is run at different times, same results may be obtained.

20 Claims, 7 Drawing Sheets

U.S. PATENT DOCUMENTS

| | | | |
|---|---|---|---|
| 2010/0121884 A1* | 5/2010 | Peoples et al. | 707/794 |
| 2010/0153368 A1* | 6/2010 | Peoples et al. | 707/722 |
| 2010/0153369 A1* | 6/2010 | Peoples et al. | 707/722 |
| 2010/0198778 A1* | 8/2010 | Venugopal et al. | 707/602 |
| 2010/0287179 A1* | 11/2010 | Peoples et al. | 707/769 |
| 2011/0072003 A1* | 3/2011 | Boldyrev et al. | 707/713 |
| 2012/0166372 A1* | 6/2012 | Ilyas et al. | 706/14 |

OTHER PUBLICATIONS

Time-Dependent Semantic Similarity Measure of Queries Using Historical Click-Through Data—Published Date: May 26, 2006.

Benchmark Queries for Temporal Databases—Published Date: 1993.

* cited by examiner

208
```
SELECT
     t0.Sub
FROM
     [rdf].[urn://example.org/Vehicle.Name@Obj@Time]('RS4', '1/1/2007') t0
CROSS APPLY
     [rdf].[urn://example.org/Vehicle.Weight@Sub@Time](t0.Sub, '1/1/2007') t1
WHERE
     t1.Obj < 3000
```

RDB query to execute graph-store query

202
```
PREFIX ex:<urn://example.org/>
SELECT ?v
AT '1/1/2007'
WHERE
{
   ?v   ex:Vehicle.ModelName   'RS4'.
   ?v   ex:Vehicle.Weight     ?w.
   FILTER(?w < 3000).
}
``` graph-store query

204 receive timeslice graph-store query

206 use paramaterized view to execute timeslice query

208 return results that match conditions of query, including timeslice condition

200
```
CREATE TABLE [rdf].[urn://example.org/
Vehicle.ModelName@Obj@Time](
     @Obj [System].[String],
     @Time [System].[UtcOffset]
)
RETURNS TABLE AS RETURN
   SELECT  Id, ModelName
   FROM    dbo.[Vehicle$Table]
   WHERE   [$ValidFrom] <= @Time
   AND     [ModelName] = @Obj
UNION ALL
   SELECT Id, Make, ModelName
   FROM    dbo.[Vehicle$Archive]
   WHERE  [$ValidFrom] <= @Time
   AND    [$ValidTo] > @Time
   AND    [ModelName] = @Obj
```

TEMPORAL BINDING FOR SEMANTIC QUERIES

RELATED PATENTS

This application is related to the following commonly assigned U.S. patent applications, which are incorporated herein by reference: U.S. patent application Ser. No. 12/823, 132, "Strong Typing for Querying Information Graphs", filed Jun. 25, 2010; and U.S. patent application Ser. No. 12/705, 983, "Expressing and Executing Semantic Queries Within a Relational Database", filed Feb. 16, 2010.

BACKGROUND

As discussed in the above-referenced patents, it is known to store and query data that is modeled as a graph. Graphs can be networks of interrelated nodes, where each node is either a subject or an object and each edge is a named value, also called a predicate. Graphs can be represented by a collection of records, where members of records can point to other records. In this way, a triple is formed as [Record, Member-Name, Record pointed to by value of MemberName]. An example of such a triple or fact might be "[a particular vehicle model] [has a model name] ['A4']". A semantic store might store many facts of this form, as well as semantically related facts.

Graph-based data has been stored with special graph databases (e.g., Neo4j by Neo Technologies). As shown in the above-related patents, graph-based data can also be stored using a relational database as the underlying storage layer, with an application layer to provide access to the data using graph semantics. In either case, as information changes in a graph-based or semantic data store, information is often erased or otherwise destroyed; facts are sometimes physically deleted. Queries against this body of information are consequently invalidated or incomplete. In other words, results obtained from a query executed at one point in time might not be identically reproduced when the query is executed at a later point in time. Additionally, such systems or data stores have not supported querying of information in ways that involve inspecting the changes that have occurred in the data, nor have they supported maintaining and querying against information about lifetimes of facts even after facts have been "deleted".

Techniques related to temporal information storage in semantic stores and temporal querying thereof are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Described are techniques to facilitate temporal features in a semantic data store. Information about lifetimes of facts in a semantic store is maintained. Even when a fact is logically deleted, a physical record is kept available. The record of a logically deleted or invalid fact has associated lifetime information. For example, valid-from and valid-to time values. The record of a fact not yet deleted may have a valid-from time value indicating when it was created, became valid, etc. Queries against the semantic store may specify a timeslice (a point in time or a time range). The lifetime information can be used to satisfy such time-specific queries. Because records are maintained after they are logically deleted, it is also possible to accurately query a past state of the semantic store. Even if such a query is run at different times, same results may be obtained.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to temporal binding in semantic storage systems and in particular to provide temporal features for semantic querying. Discussion will proceed by first discussing semantic or graph storage technology. A technique for using tables to provide fact lifetime support will be described next, followed by discussion of how such techniques may be used in practice when destructive operations occur. Performance of queries will be covered next, followed by discussion of how a same query can produce consistent results even though run at different times and even after facts matching the query may have been logically deleted.

Figure 1:
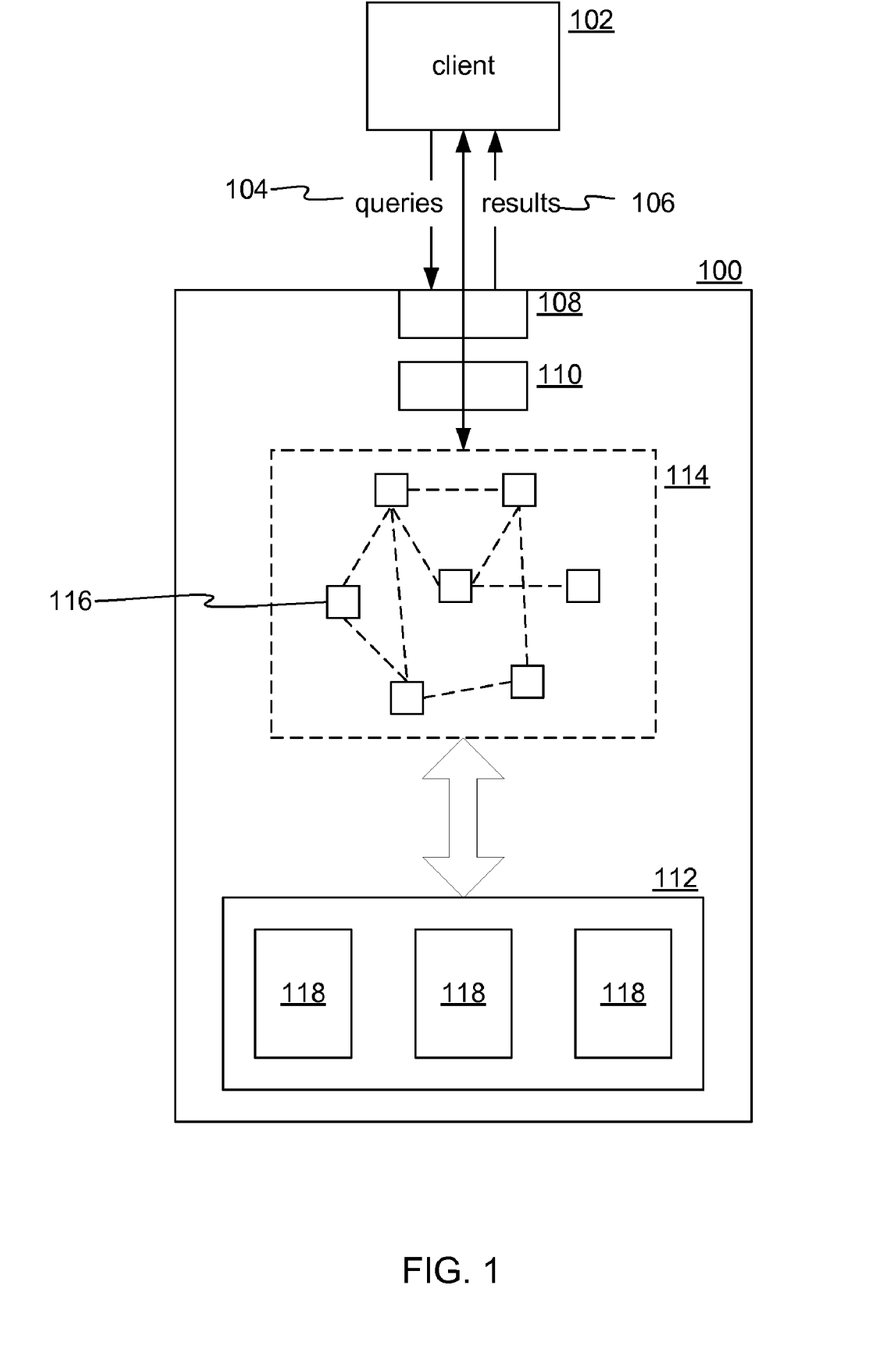
FIG. 1 shows a semantic graph store.

FIG. 1 shows a semantic graph store 100. A client 102 submits queries 104, which the graph store 100 receives, executes, and returns corresponding results 106. A query 104 may be something like "find all cars that are made by Audi and that have weight within 100 kilograms of any cars that are made by Porsche". The queries 104 are handled by a front end 108, which may provide user interface functions and may interface with a logic module 110. In embodiments that are built on a relational database 112 for underlying storage, the logic module 110 may act as an abstraction layer that provides an application programming interface (API) and uses the relational database 112 to store facts. The logic module 110 may also provide graph-like semantic access to the facts. In other embodiments, the logic module 110 may directly maintain facts and provide graph semantics without the use of a relational database. In either case, to users, the graph store 100 appears to store graph data 114 with facts 116 that may be semantically related (as indicated by dashed lines between facts 116). When a relational database is used, facts may be stored in tables 118, each corresponding to a fact type.

Figure 2:
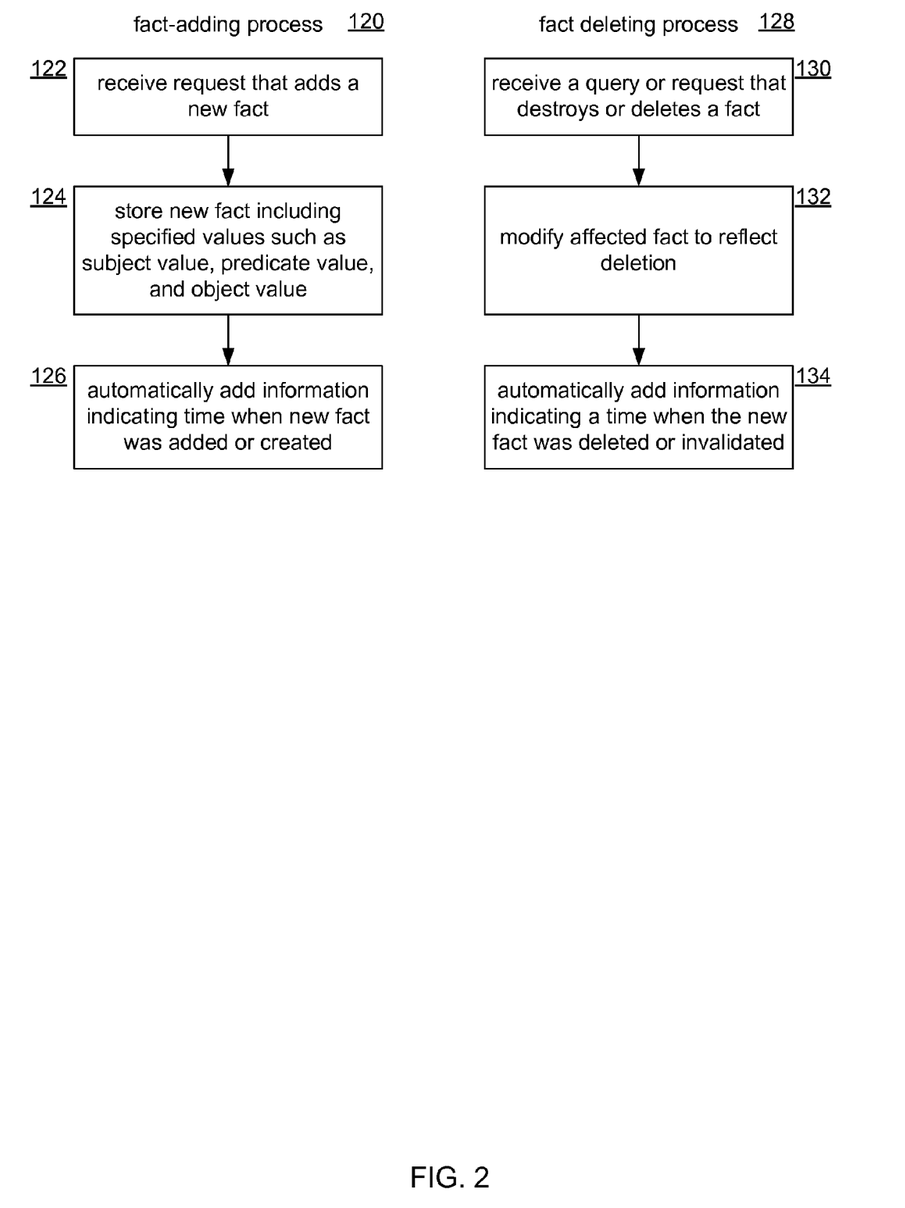
FIG. 2 shows processes performed by graph store for maintaining facts in a way that preserves facts for time-sensitive queries and in a way that provides information about lifetimes or lifespans of facts.

FIG. 2 shows processes performed by graph store 100 for maintaining facts in a way that preserves facts for time-sensitive queries and in a way that provides information about lifetimes or lifespans of facts. In a fact-adding process 120, at step 122 a request is received to add a new fact. The request may come from client 102, which might be an application running on a same computer that hosts the graph store 100, or an application on a remote computer communicating with the graph store 100 via a network. The request might include information such as a subject value (e.g., "Maker='Audi'"), possibly a predicate value (e.g., "produced"), and an object (e.g., 'A4'). In response to the request, at step 124 the graph store 100 stores the new fact, including any values specified. The new fact may be stored in association with a fact type; a data type having data type members. The values of a fact of a given fact data type will correspond to the data types of the members of the fact data type.

At step 126, lifetime information is created for the newly stored fact. The lifetime information is any stored information in the graph store 100 that indicates a time corresponding to creation or beginning of logical validity of the new fact. In one embodiment, the query itself might specify the creation or "validity" time of the new fact. In other embodiments, the lifetime information is simply any time corresponding to the addition of the new fact, such as a time when the query was submitted, a time when the fact was actually stored, a time when the query was received, etc. Note that as used herein "time" may mean a time of day, a calendar date, a combination thereof, coordinated universal time (UTC), or any unit of time. Thus, some facts (e.g., facts of certain fact types) or all facts stored in the graph store 100 may have lifetime information indicating when such facts became valid, available, added, etc., in the graph store 100.

The lifetime information can be stored in a number of ways. For example, a special table can store a "valid-from" value (a time from which a fact becomes valid, created, etc.) for each fact. In another embedment, explained in detail below, each fact, stored as a row in a table, for example, has a valid-from time value indicating a time at which the fact became valid, added, generated, etc. For example, a table storing the new fact may have a valid-from column storing time values of facts that indicate the starts of lifespans of the corresponding facts.

When a destructive operation is performed that will delete a fact, or at least a fact that is a type for which lifespan information is maintained (it is not necessary that all fact types in a graph store have lifetime information), a fact deleting process 128 is performed. Note that as used herein, physical deletion will refer to physically removing a fact or record from storage, whereas logical deletion will refer to modifying a fact in a way that reflects its having been deleted but while still physically storing a version of the fact or record. At step 130 a request or query that would delete a fact is received. In response, at step 132, the affected or target fact is modified in a way that reflects its having been deleted. In one embodiment, the fact or corresponding record is flagged as having been deleted. In another embodiment, discussed below, the fact or corresponding record is automatically migrated to an archive table; it is physically deleted from one table (e.g., a "current" table), and physically added to the archive table. At step 134 lifetime information is added to the graph store 100 that indicates or corresponds to an ending time of the lifespan of the deleted fact. For example, a time when the destructive request was issued, received, or executed, or a time when the fact was migrated, created in the archive table, a response was issued, or otherwise deemed logically invalid. In one embodiment, the archive table has a valid-to column and an end-of-lifetime time for the deleted fact is stored in the valid-to column. In another embodiment, similar information is stored in a single global table for all logically deleted facts.

Figure 3:
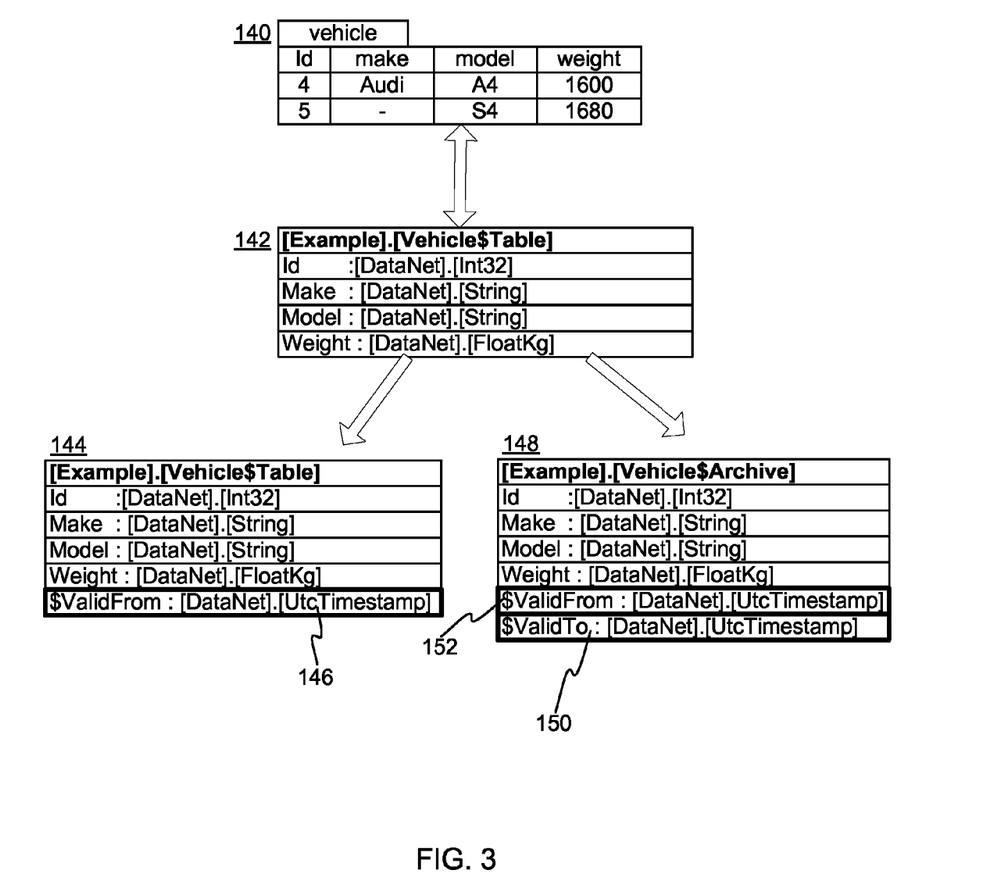
FIG. 3 shows example tables for maintaining lifetime information of facts and sustaining facts beyond deletion thereof.

FIG. 3 shows example tables for maintaining lifetime information of facts and sustaining facts beyond deletion thereof. As noted above, an efficient way to store facts is through the use of tables in a relational database to represent some of the predicates that might be associated with data of a given type. Details are presented in the above-referenced patent applications. To facilitate discussion, the following example will be used. A definition 140 of a type called 'Vehicle' is shown, which has been created to represent models of vehicles. Note that the Make, Model, and Curb Weight are shown here in tabular form. Such a tabular representation of the information corresponds well to a SQL-based storage solution, again as described in the referenced patent applications. In practice, table 142 might be created to represent instances of this VehicleModel record or fact type, without any support for temporality and with recognition that the use of table 142 alone may lead to the loss of data when records are deleted.

To support temporality, that is to store the information such as lifetime information that can support the binding of time as an independent variable, the set of tables defined for the Vehicle type are modified as follows. The original table 142 called [Vehicle$Table] is still created, but modified table 144 is provided with an extra column valid-from column 146. As with table 144, the modified table 144 will store all current values of the corresponding record or fact type, and it is this modified table 144 that will be queried if the selected time for a desired query is 'now'. For example, when no time value or time range is specified in a query, the time is by default assumed to be 'now'.

In addition to modified table 144, an archive table 148 is defined in a manner similar to the modified table 144, but with the addition of a valid-to column 150, as well as another valid-from column 152. The valid-from columns 146, 152 are used to store information identifying the moments or times the corresponding values held in the given rows in some way became valid. The valid-to column 150 stores information identifying first moments or times when the values held in the corresponding rows were not valid. These columns, then, represent the half-open range times or lifespans that the rows in question should be considered to be relevant to the values they represent.

With this embodiment, any destructive operation that would otherwise have been performed against a current table, for example modified table 144, may be generally performed as noted in the above-referenced patents. However, the data that would be lost from such a destructive operation is backed up in a corresponding archive table, for example, archive table 148. Moreover, support for continued querying of archived data can be provided by creating a dedicated table with appropriate SQL (structured query language) indexes to support high-performance querying as prior points in time are requested. Note that a valid-to column is not included in a current table (as opposed to an archive table) because values held in the current version of a table, for example modified table 144, are considered presently valid. In other words, their presence in the current table itself signifies present validity, and valid-to information is not needed because the time at which records in a current version of a table might cease to be valid is not yet known while the records are stored therein.

Given this physical representation, the graph model is presented over the basic record type's table as discussed in the above-referenced patents. For example, the selection of table-valued functions (TVFs) may be used to represent each of the possible monadic binding points available for each predicate.

Figure 4:
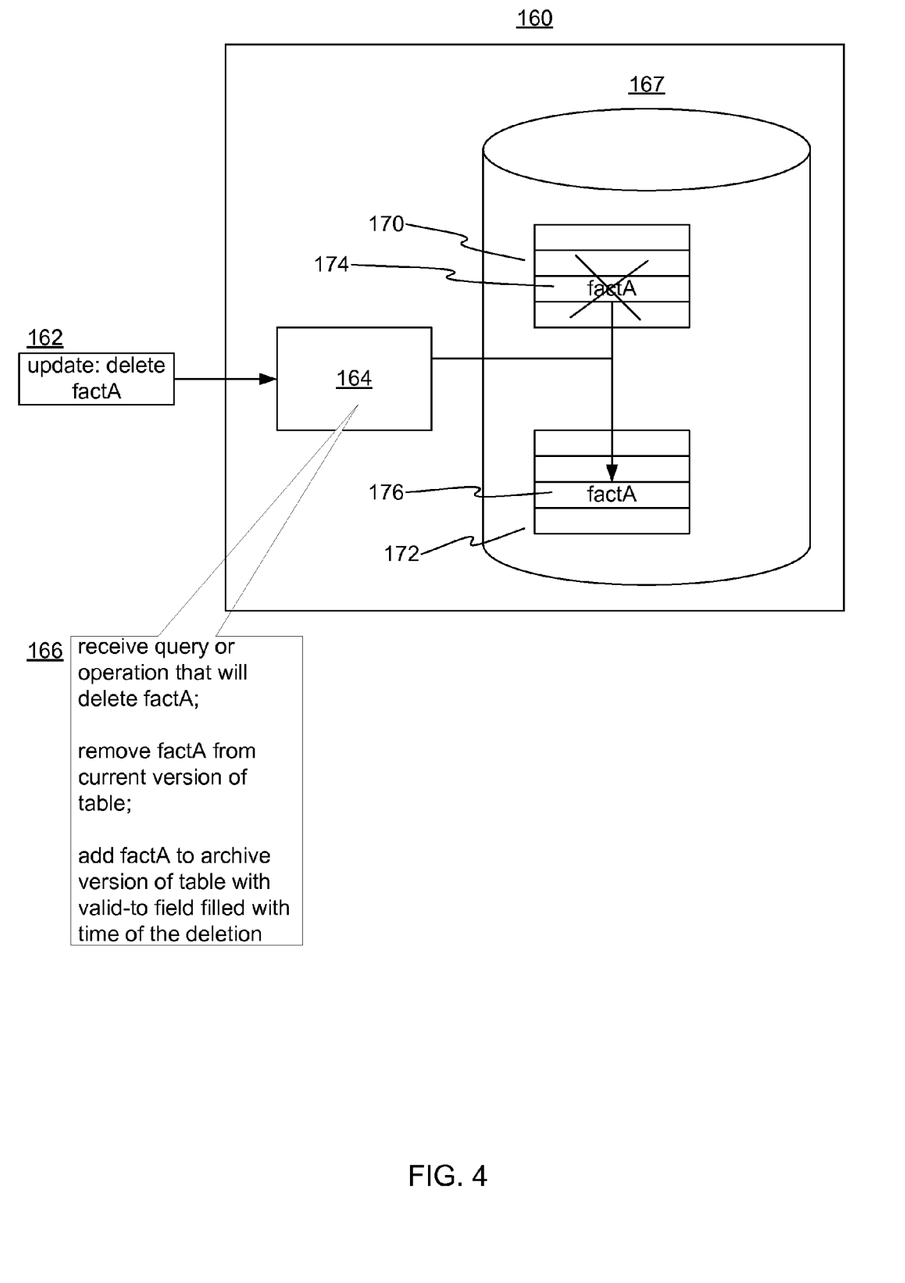
FIG. 4 shows a semantic graph store handling deletion in a way that provides lifetime management of facts.

FIG. 4 shows a semantic graph store 160 handling deletion in a way that provides lifetime management of facts. When an operation 162 is received to delete or invalidate a fact (or one or more facts), for example factA, a logic component or query engine 164 receives the operation 162, and performs a process 166 of logically deleting factA. In response, the query engine 164 accesses database 167, and in particular a current table 170 and an archive table 172. It is assumed that factA has associated valid-from information, for example, a time value in a corresponding current row 174 of current table 170 (a row storing factA). The current row 174 for factA is physically deleted from current table 170 and is added to archive table 172. When added, a time value in the valid-to column of archive table 172 is added to the new record 176. When finished, the new record 176 has the original valid-from time value as well as the new valid-to time value, thus providing information about the lifetime of factA in the graph store 160.

Figure 5:
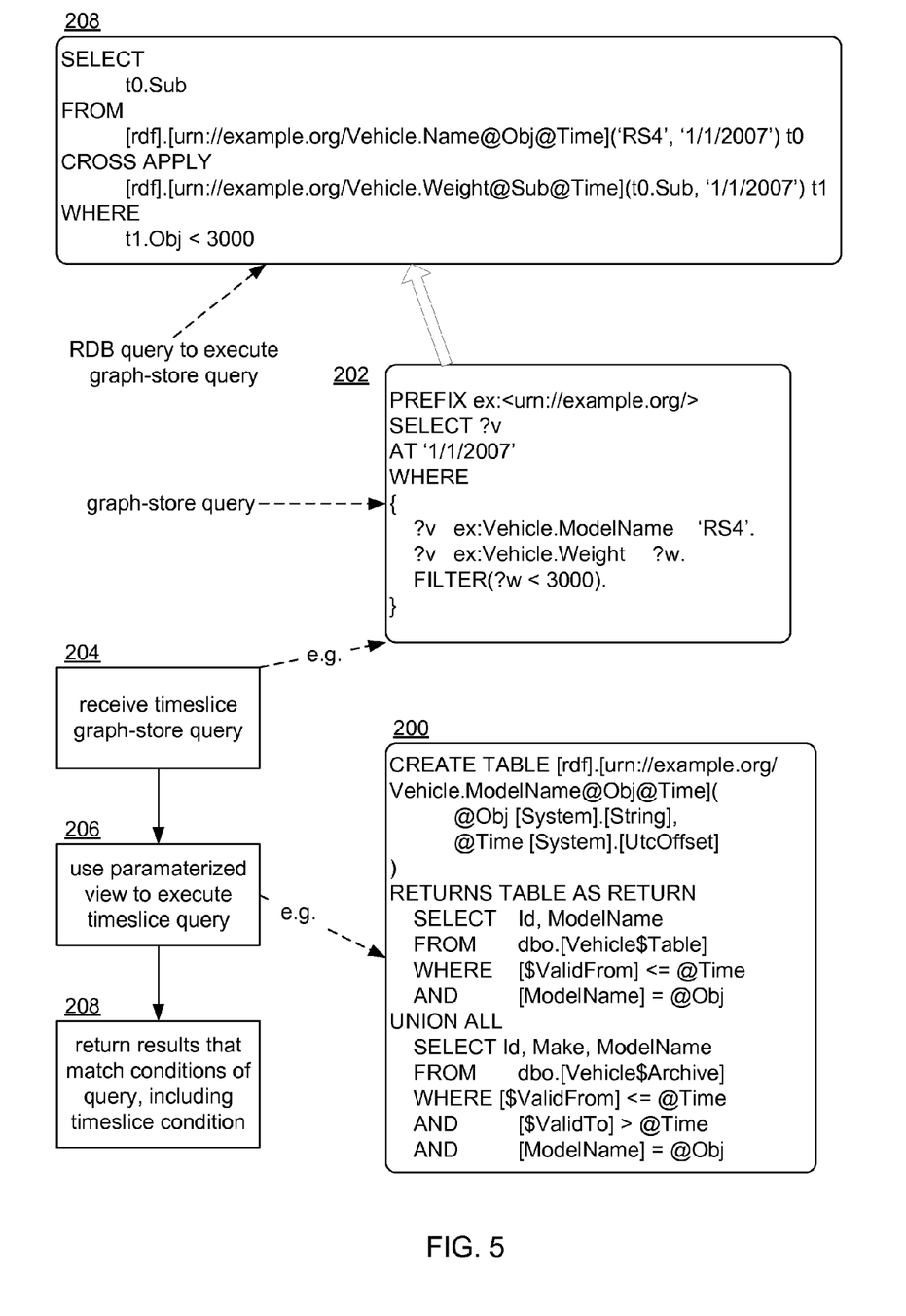
FIG. 5 shows a process and query statements for performing temporal-bound querying or viewing.

FIG. 5 shows a process and query statements for performing temporal-bound querying or viewing. In addition to the features mentioned above, extra parameterized views can be added which support timeslicing or time-specific queries. These parameterized views will add a third variable to bind, @Time. Any time such a variable is bound a TVF used to represent the binding is invoked with the necessary variable bound at query compilation time. Such a TVF will return the precise set of rows which have validity for the moment or range of time specified.

FIG. 5 shows an example simplified definition 200 for the predicate "[urn://example.org/Vehicle.ModelName]", where the object and Time are bound. This definition 200 may be used by a reasoning engine built upon a temporal graph store. Specifically, at step 204 a timeslice query is received. An example consuming timeslice query 202 specifies a timeslice of '1/1/2007' (a range would be something like '1/1/2007 to 1/1/2008'). At step 206 the parameterized view (definition 200) is used to execute the timeslice query 202. The timeslice query 202 is executed against a relational database (i.e., against a current table and/or archive table) as described in the above-referenced patents. For example, an example SQL query 208 is executed. At step 208, matching results are returned to the requestor.

Figure 6:
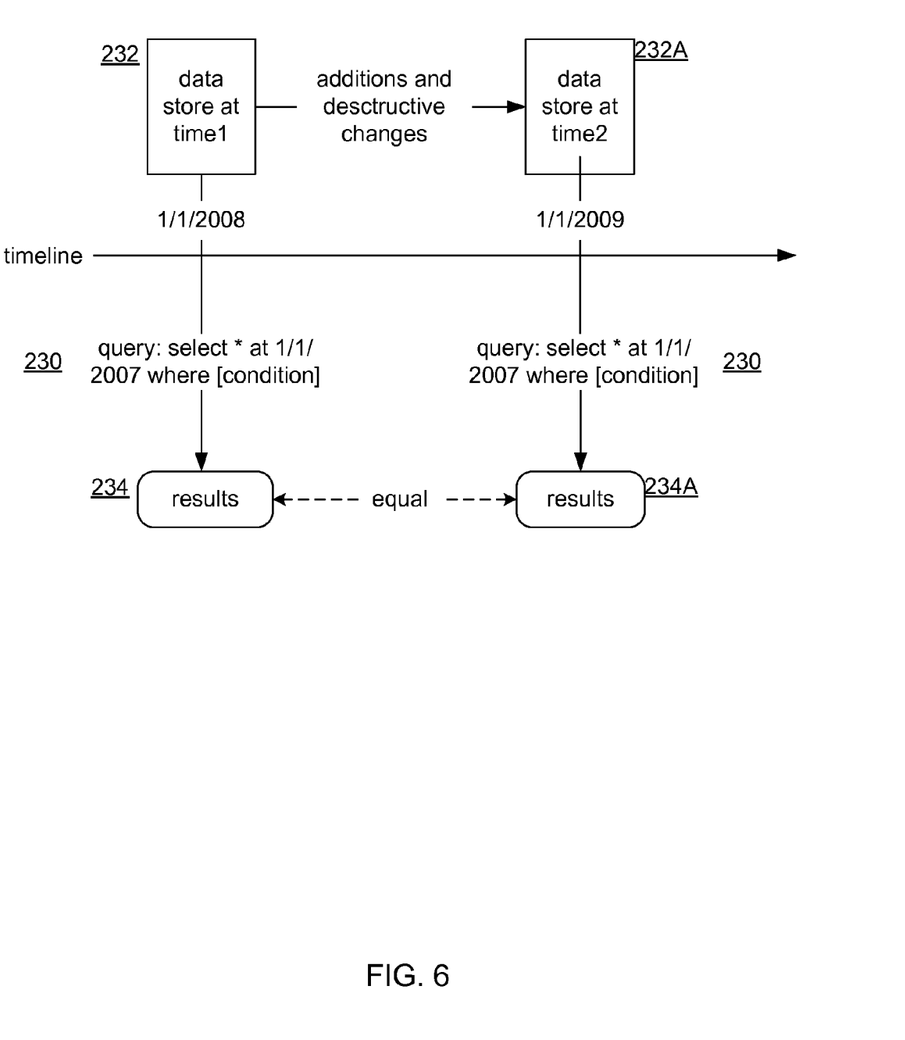
FIG. 6 shows how a timeslice-specifying query can return same results at different times.

FIG. 6 shows how a timeslice-specifying query can return same results at different times, despite interim deletion or invalidation of facts that would otherwise match the query. At time1 of 1/1/20008, a query 230 is executed against a first state of graph data store 232 at time1. A query engine looks for facts that match [condition] and that are valid during the specified time. Suppose that results 234 include factB that meets "[condition]" (e.g., "Model='A4'"), and factB at time1 had a valid-from time value of 1/1/2006 in the current table, then the results 234 at time1 would include factA. If at some time after time1 but before time2 (e.g., on 6/1/2008) there is a destructive change, then factB is moved to an archive table and given a valid-to time value of 6/1/2008. When the same query 230 is executed against a second state of graph data store 232A at time2 (e.g., at 1/1/2009) the results 234A should be the same as results 234 at time1. That is, when the query engine sees the query-specified timeslice of 1/1/2007, it looks for facts/records that match '[condition]' in the current table, from which it selects condition-matching facts that also have valid-from times preceding 1/1/2007. The engine also looks in the archive table for facts/records that match '[condition]' in the archive table and which also have time values in the valid-from and the valid-to archive columns that encompass or overlap the specified query timeslice. If factB is in the archive table with a valid-from time value of 1/1/2006 and a valid-to time value of 6/1/2008, factB, though presently deleted/invalid, will have a lifetime that encompasses the query-specified timeslice and will therefore be included in results 234A.

As shown above, for efficient performance, some implementations may handle the storage of temporal values based on the idea that facts or records that are "current" may be stored separately from facts or records as they have existed in the past. Fact-storing tables may be extended to include a single additional valid-from column that indicates a first point in time that the fact existed with the member values included in the corresponding row. To store the values of facts as they have existed in the past, each of these "current" tables has an "archive" table counterpart. As discussed, these tables will mimic the structure of non-temporal tables but with the addition of valid-from and valid-to columns. Additionally, valid-from may be appended to the primary key definition for each of the archive tables. Note that with the key defined as a composite of the corresponding record type's identity and its valid-from time, all states of a given fact will be stored contiguously in the corresponding archive table.

In one embodiment, rather than migrating a record from a current table to an archive table when logically deleted, records are added to the archive table during the lifetime of the record. If a value is created at t0 there will be a row in the corresponding current table with valid-from=t0 and a duplicate row in the archive table with valid-from=t0 and valid-to=NULL. If this value is modified at time t0, the corresponding row in the current table will be modified in-place to reflect the change and have its valid-from value updated to be t1; the existing row in the archive table will be modified to reflect valid-to=t1; and a new row will be added to the archive with valid-from=t1 and valid-to=NULL. If the row is subsequently deleted at time t2 it will no longer exist "currently" (in the logical sense), so the row will be deleted from current table and the row in the archive table will be modified to have valid-from=t1 and valid-to=t2.

CONCLUSION

Figure 7:
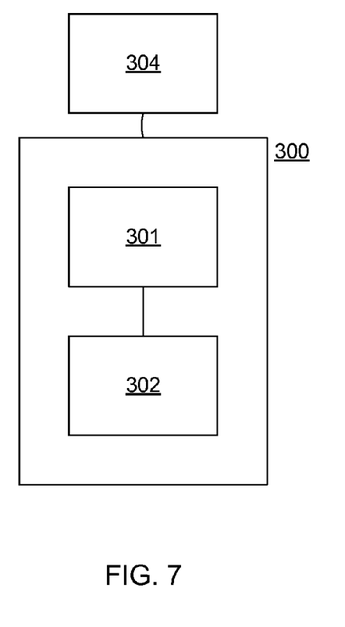
FIG. 7 shows a computer.

FIG. 7 shows a computer 300. The computer 300 has storage 301 and a processor 302. A display 304 is coupled with the computer 300. While embodiments described above may be performed on computer 300, a group of cooperating computers can also be used. Embodiments and features discussed above can be realized in the form of information stored in volatile or non-volatile computer or device readable media, either or both of which may serve as storage 301. This device readable media is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computers, the method comprising:
   executing a graph-store, the graph-store providing graph querying semantics to access facts stored in the graph-store, the graph-store including a first set of facts each of a first fact type;
   in response to a first user update submitted to the graph-store that comprises values of a new given fact of the first time, adding the given fact and its values to the graph-store, automatically adding time information to the stored given fact that indicates a time of adding the given fact to the graph-store; and
   in response to a second user update submitted to the graph-store that requests deletion of the given fact, automatically modifying the given fact in the graph-store to indicate that the given fact is no longer valid and to indicate a time of deleting the given fact.

2. A method according to claim 1, wherein the modifying comprises moving the fact from a first table to a second table, the first table including a valid-from column, the second table including a valid-from column and a valid-to column.

3. A method according to claim 2, wherein the modifying further comprises populating the moved given fact in the second table such that valid-to column contains the time of deleting the given fact.

4. A method according to claim 2, wherein the modifying further comprises physically deleting the given fact from the first table.

5. A method according to claim 1, wherein the graph-store uses a relational database to store the facts.

6. A method according to claim 1, further comprising receiving a query specifying a condition and a range of time, and executing the query by selecting facts from the graph-store that satisfy the condition and that have time information indicating that the facts where valid during the range of time.

7. A method according to claim 1, wherein regardless of when the query is executed the selecting will select facts that, based on the time information, were valid during the time range even if the facts were deleted after the time range.

8. One or more computer-readable storage media storing information that when processed by a computer causes the computer to perform a process, the process comprising:
   maintaining a semantic data store that stores graphs comprised of interrelated facts of different fact types, each fact type comprising a subject data type, predicate data type, and object data type, each fact comprising a statement comprised of values of the data types of its fact type, respectively, wherein the semantic data store is configured to execute semantic queries; and
   the maintaining including adding new facts and logically deleting existing facts, wherein each adding of a new fact comprises automatically adding to the new fact a valid-from time value indicating a time before which the new fact was invalid and after which the new fact was valid, and wherein each logically deleting an existing fact comprises adding a valid-to time value indicating a time before which the existing fact was valid and after which the existing fact became invalid.

9. One or more computer-readable storage media according to claim 8, wherein each logically deleted fact, having at one time been added, includes a valid-from time value corresponding to when it was added to the semantic data store.

10. One or more computer-readable storage media according to claim 9, wherein each fact that has not been logically deleted has no valid-to time value, whereby some facts are currently valid as indicated by their lack of a valid-to time value and some facts are currently invalid as indicated by their having a valid-to time value, such that over time the facts that are valid and invalid changes, some becoming invalid.

11. One or more computer-readable storage media according to claim 8, wherein a same query that specifies a time of facts to be retrieved, when run at different query times, returns a same set of facts that match the query and that have valid-from time values that precede the specified time and that have no valid-to time values that precede or match the specified time, wherein the same facts are in the returned set regardless of when the query time is executed including at a time when some of the facts in the set have been logically deleted.

12. One or more computer-readable storage media according to claim 8, wherein the semantic data store stores currently valid facts in a first table and stores currently invalid facts with valid-to time values in a second table.

13. One or more computer-readable storage media according to claim 12, wherein when a fact is logically deleted it is automatically removed from the first table and automatically added to the second table and a corresponding valid-to time value is added to the logically deleted fact, the logically deleted fact including a same valid-from time value that it had when it was stored in the first table.

14. One or more computer-readable storage media according to claim 13, wherein the first table has a valid-from column that stores the valid-from time value of the logically deleted fact, and wherein the second table has a valid-from column that stores the valid-from time value of the logically deleted record and has a valid-to column that stores the valid-to time value of the logically deleted record.

15. One or more computer-readable storage media according to claim 14, wherein the process further comprises receiving, after the logically deleted fact was logically deleted, a query specifying a time range of facts to the retrieved, wherein the logically deleted fact is included in a result of the received query based on the valid-from time value of the logically deleted fact falling within the time range and the valid-to time value falling outside the time range.

16. A computer comprising storage and a processor, the storage storing:
   a graph store storing a graph of facts, the facts conforming to a schema describing the graph, wherein each fact comprises a triplet comprising a subject value, a predicate value, and an object value, wherein the facts are instances of varying different fact types that have different subject data types and/or different predicate data types and/or different object data types, and wherein the semantic graph store is configured to receive semantic queries for facts in the graph store, wherein when facts are stored by automatically maintaining information indicating lifespans of each fact in the graph store.

17. A computer according to claim 16, wherein when a query is executed at a given time and specifies a timeslice earlier that precedes the given time, facts that match the query and that have lifespans that correspond to the timeslice are returned as satisfying the query, even though some of the returned facts have lifespans ending prior to the given time.

18. A computer according to claim 16, wherein the facts are stored in tables in a relational database, wherein tables represent predicates associated with corresponding fact types.

19. A computer according to claim 16, wherein a parameterized view is used to view facts at any point in time according to the lifespans.

20. A computer according to claim 16, wherein the graph store receives graph queries having graph semantics and form, and converts the queries into relational database queries to be executed against a relational database storing the facts.

* * * * *